(12) United States Patent
Zell et al.

(10) Patent No.: US 12,017,893 B2
(45) Date of Patent: Jun. 25, 2024

(54) ROLLING BEARING AND MATERIAL TRANSFER- OR CONSTRUCTION MACHINE HAVING SUCH A ROLLING BEARING

(71) Applicant: Liebherr-Components Biberach GmbH, Biberach an der Riss (DE)

(72) Inventors: Robert Zell, Schemmerhofen (DE); Stefan Malik, Ravensburg (DE)

(73) Assignee: LIEBHERR-COMPONENTS BIBERACH GMBH, Biberach an der Riss (DE)

( * ) Notice: Subject to any disclaimer, the term of this patent is extended or adjusted under 35 U.S.C. 154(b) by 249 days.

(21) Appl. No.: 17/613,897

(22) PCT Filed: May 25, 2020

(86) PCT No.: PCT/EP2020/064450
§ 371 (c)(1),
(2) Date: Nov. 23, 2021

(87) PCT Pub. No.: WO2020/239700
PCT Pub. Date: Dec. 3, 2020

(65) Prior Publication Data
US 2022/0234869 A1    Jul. 28, 2022

(30) Foreign Application Priority Data

May 24, 2019    (DE) .......................... 102019113897.3

(51) Int. Cl.
*F16C 33/58*    (2006.01)
*B66C 23/84*    (2006.01)
(Continued)

(52) U.S. Cl.
CPC .............. *B66C 23/84* (2013.01); *F16C 19/26* (2013.01); *F16C 19/364* (2013.01);
(Continued)

(58) Field of Classification Search
CPC ...... F16C 19/26; F16C 19/364; F16C 19/382; F16C 19/505; F16C 19/545; F16C 25/06;
(Continued)

(56) References Cited

U.S. PATENT DOCUMENTS 3,737,203 A    6/1973    Hawk
4,592,667 A    6/1986    Malik
(Continued)

FOREIGN PATENT DOCUMENTS

DE        1228465 A      11/1966
DE    102010011462 A1    9/2011
(Continued)

OTHER PUBLICATIONS

International Search Report and Written Opinion from Application No. PCT/EP2020/064450 dated Sep. 1, 2020 (with English translation of Search Report).

(Continued)

*Primary Examiner* — Phillip A Johnson
(74) *Attorney, Agent, or Firm* — Troutman Pepper Hamilton Sanders LLP; Ryan A. Schneider; Stephanie J. Remy

(57) ABSTRACT

A rolling bearing having concentric bearing rings supported on one another rotatably with respect to each other by means of at least one row of rolling elements and have bearing races for the rolling elements of the at least one row of rolling elements. The invention further relates to a material transfer- or construction machine, such as a crane or cable excavator, having such a rolling bearing. Providing different bearing race corrections in different angular sectors of the bearing rings and/or providing the bearing race correction only in a fraction of the circumference of the bearing rings is advantageous over the conventional use of a bearing race correction that is constant over the circumference. A bearing (Continued)

Figure 1:
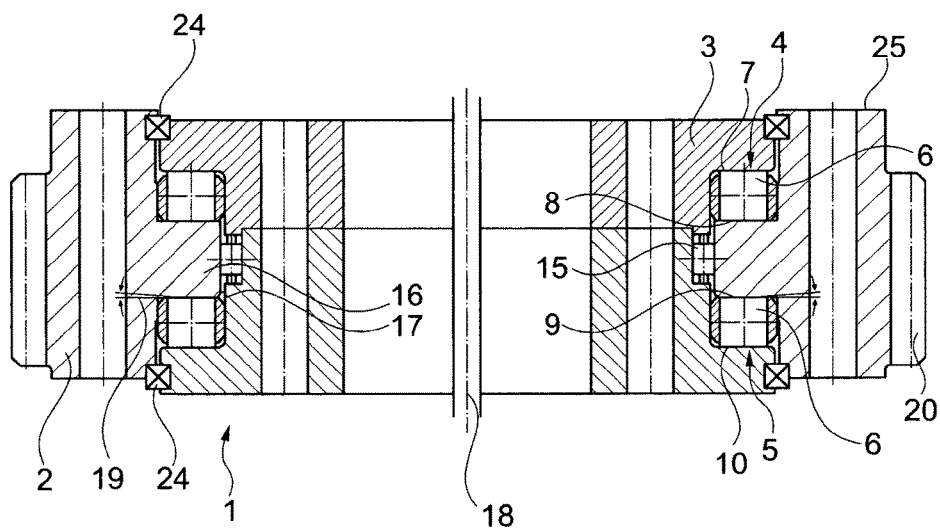

race correction that is limited to one sector or that is different from sector to sector, or that is not constant over the circumference, enables the bearing rings to adapt to expected loads.

21 Claims, 7 Drawing Sheets

(51) Int. Cl.
    *F16C 19/26*         (2006.01)
    *F16C 19/36*         (2006.01)
    *F16C 19/38*         (2006.01)
    *F16C 19/50*         (2006.01)

(52) U.S. Cl.
    CPC .......... *F16C 19/381* (2013.01); *F16C 19/505* (2013.01); *F16C 33/585* (2013.01); *F16C 33/586* (2013.01); *F16C 2300/14* (2013.01); *F16C 2350/26* (2013.01)

(58) Field of Classification Search
    CPC ...... F16C 33/46; F16C 33/585; F16C 33/586; F16C 2300/14; F16C 2350/26; B66C 23/84
    See application file for complete search history.

(56) References Cited

U.S. PATENT DOCUMENTS

| | | |
|---|---|---|
| 10,451,106 B2 | 10/2019 | Sauter |
| 2013/0202234 A1 | 8/2013 | Noda |
| 2015/0275972 A1 | 10/2015 | Feld |
| 2016/0047417 A1* | 2/2016 | Kruhoffer ............. F16C 27/066 384/569 |
| 2018/0258997 A1* | 9/2018 | McNichols ............. F16G 11/12 |
| 2019/0085898 A1* | 3/2019 | Zang ..................... F16C 19/386 |

FOREIGN PATENT DOCUMENTS

| | | | |
|---|---|---|---|
| DE | 202015006588 U1 | | 12/2016 |
| DE | 102018200309 A1 | * | 2/2019 |
| EP | 2092204 B1 | | 8/2009 |
| EP | 3312414 A1 | | 4/2018 |
| JP | 2013137074 A | | 7/2013 |
| WO | 2007082532 A1 | | 7/2007 |
| WO | 2008088213 A2 | | 7/2008 |
| WO | 2018/166661 A1 | | 9/2018 |

OTHER PUBLICATIONS

German Patent Office Search Report from Application No. 102019113897.3 dated Mar. 20, 2020.

* cited by examiner

ROLLING BEARING AND MATERIAL TRANSFER- OR CONSTRUCTION MACHINE HAVING SUCH A ROLLING BEARING

The present invention relates to a rolling bearing having two bearing rings which are concentric with one another, are supported on one another rotatably with respect to each other by means of at least one row of rolling elements and have bearing races for the rolling elements of the at least one row of rolling elements. The invention further relates to a material transfer- or construction machine, such as a crane or cable excavator, having such a rolling bearing.

In rolling bearings installed in larger or highly loaded structures such as cranes, in addition to axial and/or radial forces, high bending moments and tilting loads often occur which act on the bearing rings and can lead to deformation and an angular offset to the bearing rings relative to each other, and so premature wear occurs in the region of the bearing rings and rolling elements. For example, center-free large rolling bearings, which can measure several meters in diameter, can be employed on cranes or cable excavators, for instance, to pivot and support the support mast of a ship crane or of a harbor crane or the boom of a revolving tower crane. In a similar manner, rolling bearings are subjected to high bending moments and tilting forces, for example in the slewing gear of a derrick crane or a telescopic boom crane. In this case, the resulting problems of twisting and tilting are further aggravated when the middle or center of the bearing has to be kept free to permit the component that is to be supported, such as the aforementioned crane support mast, to pass through the bearing or in order to be able to attach a rotary drive to the part that is to pass through. Due to a lack of space, the bearing rings of a center-free rolling bearing such as this cannot be manufactured in any desired size, especially in the radial direction, and so the area moments of inertia that can be achieved in the bearing rings are limited.

Rolling bearings of the type are shown, for example, in EP 2092204B1 or WO 2008/088213A2.

Generally, in large material transfer- or construction machines of the type the vertical crane or construction machine loads and the corresponding reaction forces in the slewing gear bearing still account for a large or considerable part of the rolling bearing load, and so the thrust bearing/bearings, which has/have to absorb the vertical loads, is/are typically configured in the form of a load-carrying cylindrical roller bearings or tapered roller bearing, the cylindrical rollers or tapered rollers of which have a relatively large roller width in order to allow for a sufficiently large contact line and to keep surface pressures tolerable. On the other hand, such wide roller bearings react critically to tilting or inclinations of the bearing races relative to each other, since very quickly only a very small part of the rollers actually bears a load and a high edge load occurs.

If such roller bearings are subjected to "edge wear", in which essentially it is only the edge areas of the cylindrical or tapered rollers that are still bearing, there is a sharp increase in wear on the rolling elements and the bearing races.

In this respect, multirow rolling bearings with complex race structures have already been proposed, which can have intermeshing lug rings and grooves that are supported on one other by rows of thrust bearings and radial bearings in order to prevent the bearing races from lifting off or excessive torsion of the bearing rings.

On the other hand, it has already been suggested that the bearing races be corrected in their angles of incidence and/or in their cross-sectional contour so that they are suitably inclined or positioned and/or shaped in the loaded bearing condition and the rolling elements can suitably nestle against them. In particular, such a bearing race correction may comprise a slight inclination or tilt of the bearing race or a slight bowing of the bearing race in cross-section, so that the bearing race in the unloaded state per se has a misalignment or a contour deviation relative to the circumferential surface of the rolling element. However, if the rolling bearing is subjected to the forces that occur as intended, the bearing race will twist or deform into a position or contour that then matches the rolling elements. If, for example, cylindrical rollers are used as rolling elements, such a bearing race correction can have a slight inclination or inclination of the bearing races so that the raceways between which the cylindrical rollers run are not exactly parallel to each other in the unloaded or unstressed state. Alternatively or in addition to such a slight inclination, the bearing race can also be of a slightly domed form or slightly concave in cross-section, so that the bearing race is only straightened, so to speak, by the load to be absorbed as intended and forms a flat bearing race surface on which the cylindrical rollers can firmly rest.

Such bearing race corrections have the advantage that no complex bearing race structures with nested lug rings and grooves are required which can of course be provided in addition and the cross-sections of the bearing races can be kept compact or small. No attempt is made to prevent torsion of the races with all possible force, but an attempt is made to allow such torsion or to compensate for torsion that cannot be avoided by angular and/or form corrections of the bearing races.

On the other hand, such bearing race corrections are, at least up to now, not very suitable for ensuring a tight fit of the rolling elements if the races do not twist uniformly or are subject to different loads in sections, in particular tilting moments and bending loads. For example, such sectionally different deformations of the bearing rings occur if the adjacent construction to the slewing bearing is configured to be inhomogeneously rigid. Sometimes certain areas in the adjacent construction have to be omitted or made thinner than other areas in order to create space for machine components to be connected or passed through. If the bending moments and tilting forces induced by the load are not uniformly introduced into the bearing rings of the rolling bearing by the adjacent construction, the bearing rings of the rolling bearing will deform to different extents in different bearing ring sections. This means that an inclined position of the bearing race intended as a bearing race correction, for example, no longer fits if the bearing ring in the area of a recess or weakening of the adjacent construction is no longer deformed to fit due to a lower bending load.

It is proceeding from the underlying object of the present invention to provide an improved rolling bearing and an improved material transfer- or construction machine of the type in each case that avoid disadvantages of the prior art and advantageously further develop the latter. In particular, the "edge wear" is to be avoided and improved loading condition under load is to be achieved with full contact of the rolling elements and line contact between the bearing race and rollers essentially over the entire width of the cylindrical or tapered rollers and thus reduced stressing of the bearing races even if uneven bearing loads occur due to inhomogeneously rigid adjacent constructions and/or unevenly distributed loads.

The task is solved, according to an embodiment of the invention, with a rolling bearing rolling bearing having two bearing rings which are concentric with one another, are supported on one another rotatably with respect to each other by means of at least one row of rolling elements and have bearing races for the rolling elements of the at least one row of rolling elements, wherein at least one of the bearing races is provided with a bearing race correction for compensating for torsions of the bearing ring under load, characterized in that different bearing race corrections are provided in different angular sectors of the bearing rings and/or the bearing race correction is provided only in a fraction of the circumference of the bearing rings. The task is solved, according to another embodiment of the invention, with a material transfer- or construction machine, in particular in the form of a crane or a cable excavator, comprising a load-receiving means extending from a boom or a support arm, and a slewing gear for rotating the boom or support arm about an upright slewing gear axis, the slewing gear comprising the rolling bearing heretofore disclosed.

It is therefore proposed to no longer provide a bearing race correction that is constant over the circumference, as has been the case up to now, but to vary the bearing race correction over the circumference of the bearing rings and to adapt it specifically to the loads to be expected as intended. The invention proposes providing different bearing race corrections in different angular sectors of the bearing rings and/or providing the bearing race correction only in a fraction of the circumference of the bearing rings. Such a bearing race correction, which is limited to one sector or which is different from sector to sector or which is not constant over the circumference, is based on the consideration that, for example, in the case of very inhomogeneous adjacent constructions with different load directions such as, for example, a changing tilting moment, very different deformations of the bearing rings can occur, so that a uniform bearing race correction is only optimal for a certain area, while in other areas the same modification of the bearing race can have the opposite effect and even increase the stress. Instead of such a uniform bearing race correction, which is constant over the entire circumference, there is carried out a targeted adaptation of the bearing race correction, which varies by angular sector, to the decisive load direction and/or the given adjacent construction. If, for example, an angular sector of a bearing ring is more heavily loaded with a bending moment or tilting forces due to the adjacent construction or a decisive load direction, provision can be made for a stronger bearing race correction in this sector than in a less heavily loaded angular sector of the bearing ring. Similarly, provision can be made for different angular sectors with different bearing race corrections if the two angular sectors have to absorb comparable bending moments and tilting forces in terms of height but opposite moments and forces in terms of sign in the prevailing load case.

In particular, an angular correction of the bearing race can be provided as a bearing race correction, whereas an inclination of the bearing race can be provided, for example in a radial cross-sectional plane, which in itself does not match the alignment of the circumferential contour of the rolling elements as long as the bearing ring remains unloaded or unstressed, but which then adapts to the alignment of the rolling element circumferential surface when the decisive load case occurs. For example, if cylindrical rolling elements are used, the bearing race may be provided with a slight inclination to a plane perpendicular to the axis of rotation if it is a thrust rolling bearing series. In the case of radial bearings, provision can be made for an inclination to the axis of rotation.

If tapered rollers are used as rolling elements, the bearing race can be provided with an inclination which, in the unloaded state of the bearing, deviates slightly from the inclination or taper angle of the tapered rollers and, in the loaded state, adapts to the inclination of the flanks of the tapered rollers so that edge wear of the tapered rollers is avoided.

Alternatively or in addition to such an angular correction, however, the bearing race correction may also comprise a shape correction of the bearing race cross-section. For example, the bearing race may have a contour in a slightly domed form or slightly concave contour when viewed in cross-section if cylindrical or tapered rolling elements are used. Similarly, if barrel rollers are used, an arc-shaped curvature can be provided which deviates from the curvature of the barrel elements in order to achieve full contact of the rolling elements in the case of load with corresponding deformation.

In further development of the invention, for example, a slight angular correction can be provided in one angular sector of a bearing race and a stronger angular correction can be provided in another angular sector deviating therefrom, for example opposite thereto, it also being possible, if appropriate, to provide inclinations of the same amount but in different directions or with different signs. Alternatively, it can be provided that only a limited angular sector of a bearing race is provided with an angular correction, i.e., a certain inclination, while the remaining bearing race is formed without angular correction, for example with a flat bearing race exactly parallel to a plane perpendicular to the axis of rotation, or an exactly cylindrical bearing race.

Similarly, a slightly arc-shaped curvature can be provided in one angular sector of the bearing race and a more pronounced curvature can be provided in another angular sector deviating therefrom, in particular opposite thereto, as a shape correction, it also being possible to provide a shape correction at all only in a limited angular sector and to form the remaining bearing race part without a shape correction.

In further development of the invention, angular and shape corrections of the bearing race cross-section can also be combined with one another, wherein, for example, an angular correction can be provided in one angular sector of a bearing race and a shape correction, for example in the form of an arc-shaped curvature of the bearing race cross-section, can be provided in another angular sector deviating therefrom, in particular opposite thereto.

Irrespective of the type of bearing race correction, i.e., angle correction or shape correction, it may be sufficient to provide a bearing race correction on only one of the two bearing rings. Advantageously, the bearing race correction may be provided on the bearing race which is relative to the load which load generates or induces or influences the bending moments and tilting forces to be compensated and the resulting twists. If the rolling bearing is used, for example, as a slewing ring bearing of a tower crane, the bearing race corrections can be provided on the bearing ring, which rotates with the boom of the tower crane and is thus relative to the load.

Alternatively or additionally, however, the bearing ring, which twists relative to the load, can be provided with a bearing race correction.

As an alternative or in addition to a correction of the bearing races, provision can be made for a rolling element correction. In particular, if the rolling elements run in a guided cage, there can be used rolling elements with varying contours around the circumference of the cage. In particular, more tapered rolling elements may be used in one angular sector of the cage, while less tapered or cylindrical rolling elements may be provided in another angular sector of the cage. For example, such a guided rolling element cage may have two opposing angular sectors, with tapered rollers being provided in a first of the two angular sectors, and cylindrical rollers or tapered rollers with a different tapered contour being provided in a second of the angular sectors.

Advantageously, the cage may be guided on and/or rotate with the bearing ring, which is arranged to be stationary relative to the load. Alternatively, however, it would also be possible to guide the differently contoured rolling elements in a cage that is not relative to the load but can rotate with respect to the load.

Such a rolling element correction may not only be given in a varying taper of the rolling elements or tapered rollers on the one hand and cylindrical rollers on the other hand, but may also include a varying contouring of the circumferential contour of the rolling elements, for example a combination of barrel rollers and cylindrical rollers or barrel rollers and tapered rollers. While barrel rollers are provided in a first angular sector of the cage, tapered rollers can be used in another angular sector.

Rolling element correction, for example in the form of different tapers or differently shaped circumferential contours, can be combined with bearing race correction. For example, it may be provided that in a first angular sector of a bearing ring, the bearing race thereof is corrected, for example slightly inclined, and the bearing race is otherwise uncorrected. The rolling elements rolling on the bearing race may be guided in a cage, tapered rollers being provided in a first sector of the cage and cylindrical rollers being provided in a second angular sector of the cage.

Alternatively or in addition to such bearing race or rolling element corrections, a correction can also be provided in the area of the connection of the rolling bearing to the mounting environment. In particular, an adjacent surface of a bearing race and/or an adjacent surface of the adjacent construction to which the rolling bearing is attached may be formed with a correction, wherein such a correction between the rolling bearing and the bearing structure may comprise, in particular, an angular correction, but also a shape correction. In particular, an adjacent surface of the bearing ring with which the bearing ring is mounted to the adjacent structure may be slightly inclined or ramped so that the clamping of the bearing ring to the adjacent structure implies a correction in the region of the bearing races or the engagement between the rolling elements and the bearing races.

Alternatively or in addition to such an angular correction on an adjacent surface of a bearing ring, the adjacent surface of the adjacent structure may also be angularly corrected, for example slightly ramped.

If, for example, a bearing ring is clamped, for example screwed, with its end face against an opposite end face of the adjacent construction, the end face of the bearing ring and/or the end face of the adjacent construction may be slightly ramped with respect to a tangential plane to the end face.

Such a correction in the region of the adjacent construction or of the transition between the rolling bearing and the adjacent construction can advantageously also be formed variably over the circumference of the rolling bearing, in particular be limited or formed differently in sectors in the manner. For example, the adjacent surface of a bearing ring may be slightly angle-corrected in one angular sector of the bearing ring and angle-corrected in a different manner in an opposite angular sector, such as by a different sign and/or magnitude of the angle of inclination.

The bearing race correction varying over the circumference of the rolling bearing and/or rolling element correction varying over the circumference and/or connection correction varying over the circumference can be configured differently with regard to their distribution over the circumference or distribution over different angular sectors and adapted to different load directions and/or connection designs. If the rolling bearing is used in the slewing gear of a material transfer- or construction machine, the load means of which runs off a boom or a support arm, it may be advantageous if the bearing race correction and/or the rolling element correction is formed over the circumference of the rolling bearing at least approximately symmetrically with respect to a plane which extends upright and passes through the load means and the slewing gear axis. Usually, in such material transfer- or construction machines, the predominant load direction depends on the rotational position of the boom or support arm, so that the bearing race correction can be adapted to the rotational position of the boom or support arm and, in particular, distributed symmetrically thereto.

Figure 2:
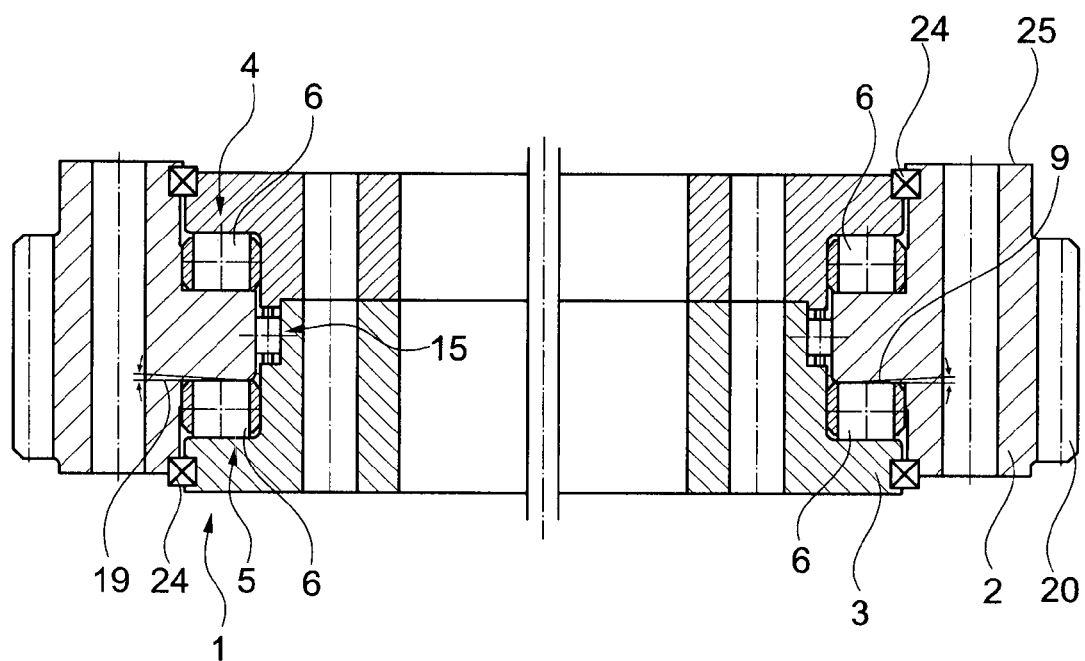
Figure 3:
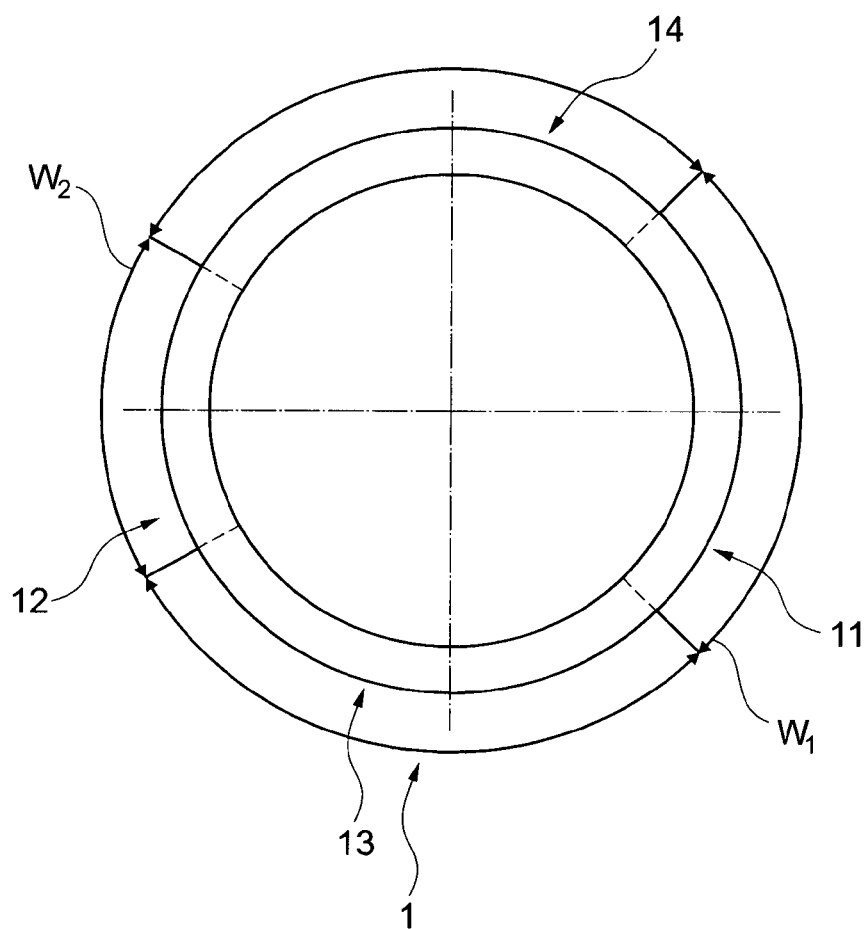
Figure 4:
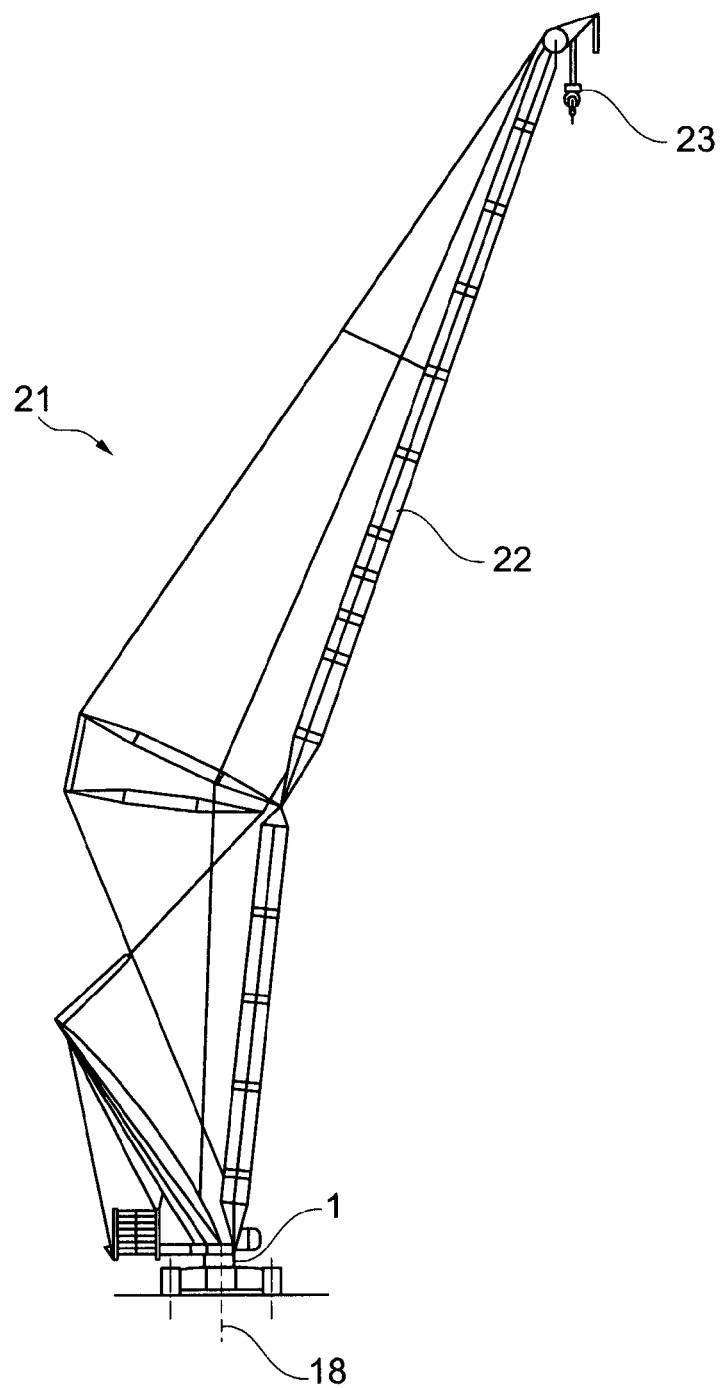

The invention will be explained in more detail in the following with respect to preferred embodiments and to associated drawings. The drawings show:

FIG. 1: a sectional view of a rolling bearing according to an advantageous embodiment of the invention, in which provision is made for a bearing race for a row of rolling elements with a bearing race correction which has correction angles of different sizes and the same sign in different angular sectors of the bearing race, FIG. 2: a sectional view of a rolling bearing according to a further advantageous embodiment of the invention, wherein provision is made for a bearing race for a rolling element row with a bearing race correction having correction angles of different signs in different angular sectors of the bearing race, FIG. 3: a schematic plan view of the rolling bearing of FIG. 1 or FIG. 2, the plan view showing the different angular sectors of the rolling bearing in which there are shown bearing race corrections with different correction angles as well as the transition regions lying in between, FIG. 4: a schematic side view of a material transfer- or construction machine in the form of a telescopic mobile crane, the superstructure of which, with a boom articulated thereto, is rotatably supported by a slewing gear on an undercarriage about an upright slewing gear axis, which slewing gear has a rolling bearing as shown in FIGS. 1-3, FIG. 5: a perspective view of a bearing race of a rolling bearing according to FIGS. 1-3 with a variable bearing race correction in a half-section view, wherein the cross-sectional contours different due to the variable bearing race correction are shown in different sectors, and FIGS. 6A, B: are a comparative representation of the loading condition of a bearing with an uncorrected bearing race and a bearing with a corrected bearing race, wherein partial view 6A shows the edge carrying of a roller bearing with tilted, uncorrected bearing races, and partial view 6B shows the harmonic loading condition of a roller bearing over the full roller width with tilted, but corrected bearing races.

Figure 7:
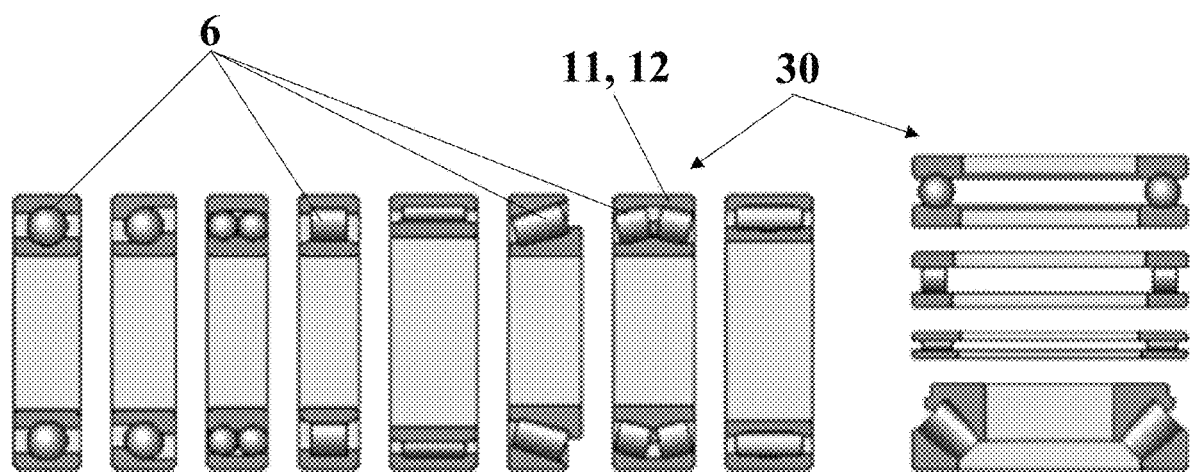

FIG. 7: a schematic view of rolling elements guided by a guided rolling element cage, characterized in that rolling elements of different conical shapes are arranged in different angular sectors of the rolling element cage and/or only conical rolling elements are provided in one angular sector of the rolling element cage and only cylindrical rolling elements are provided in another angular sector.

As shown in FIGS. 1-2, the rolling bearing 1 may have two bearing rings 2 and 3 concentric with each other and may be center-free, the rolling bearing 1 being a large diameter rolling bearing which may be used, for example, as a slewing gear bearing in a crane 21 or other material transfer- or construction machine such as, for example, a cable excavator or a ship crane or a harbor crane. As FIG. 4 shows, the rolling bearing 1 can, for example, support a superstructure of a crane about an upright slewing gear axis 18 on an undercarriage, which can be self-propelled, for example in the form of a truck. A boom 22 may be supported on the superstructure from which a load lifting means 23, for example in the form of a load hook, extends and can be raised or lowered. The boom 22 may be telescopic and/or lulling, and has a projection such that the load carrying means and the load suspended therefrom, as well as the boom 22 itself, have a lever arm with respect to the rolling bearing 1 which results in not only vertical forces but also high bending moments being introduced into the rotary bearing 1.

As shown in FIGS. 1-2, the bearing rings 2 and 3 may be rotatably supported with respect to each other by means of a plurality of rows of rolling elements, and thrust bearings and/or radial bearings may be provided. For example, two thrust bearing rows 4 and 5 and one radial bearing row 15 may be provided to support the two bearing rings 2 and 3 against each other in the axial direction and in the radial direction.

For example, the bearing rings 2 and 3 may engage each other with an annular groove structure, wherein one of the bearing rings 2 may have a radially protruding lug 16 that may engage a groove 17 in the other bearing ring 3. The rows of rolling elements 4, 5 and 15 may be arranged in the gap formed between the lug 16 and the groove 17, wherein for example the lug 16 may be supported by two thrust bearing rows 4 and 5 arranged on opposite sides of the lug 16. The radial bearing 15 may be located on the circumferential side of the lug 16 and/or positioned between the thrust bearings 4 and 5.

The rolling elements 6 of the rolling element rows 4, 5 and 15 can in principle be of different designs, wherein cylindrical rollers, for example, can be provided as rolling elements. In principle, however, other rolling element shapes such as tapered rollers or barrel rollers or, where appropriate, balls can also be provided, and the various bearing series can also comprise different rolling element shapes. As the figures show, all bearing rows in particular can comprise cylindrical rollers.

As FIG. 1 and FIG. 2 show, the bearing rings 2 and 3 have bearing races 7, 8, 9, 10 for the rolling element rows 4 and 5, with the corresponding bearing races also being provided for the additional radial rolling bearing row 15. When cylindrical rollers are used, the bearing races 7, 8, 9, and 10 can be of substantially flat design, although slightly arc-shaped or curved bearing race cross-sectional contours can also be provided as bearing race correction. The bearing races 7, 8, 9 and 10 each extend at least approximately in a plane perpendicular to the axis of rotation 18 of the rolling bearing 1, although at least one of the bearing races 9 may comprise a bearing race correction in the form of an angular correction such that the bearing race 9 is slightly inclined relative to the plane 19 perpendicular to the axis of rotation 18.

In this case, the bearing race correction is not configured uniformly over the entire circumference, but changes when viewed over the circumference.

Figure 5:
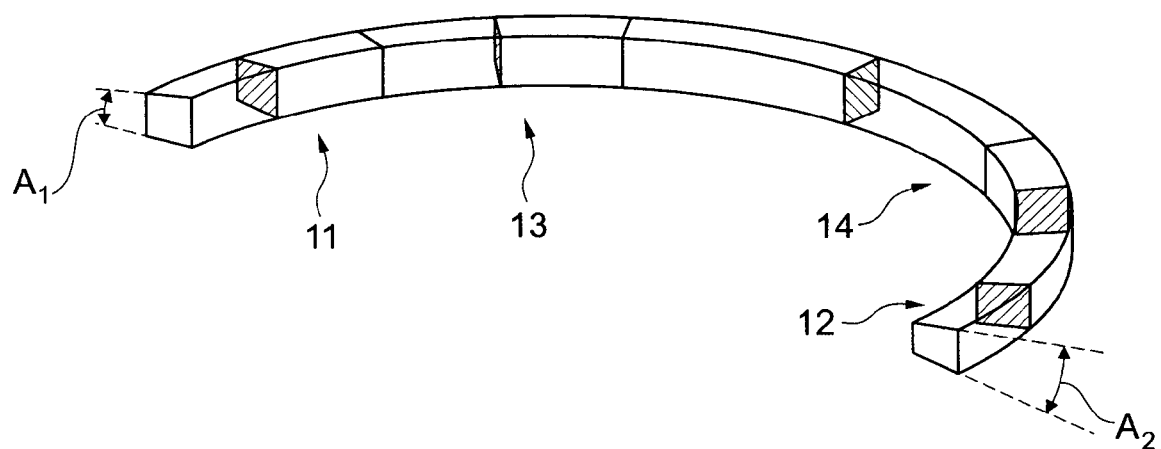
Figure 6:
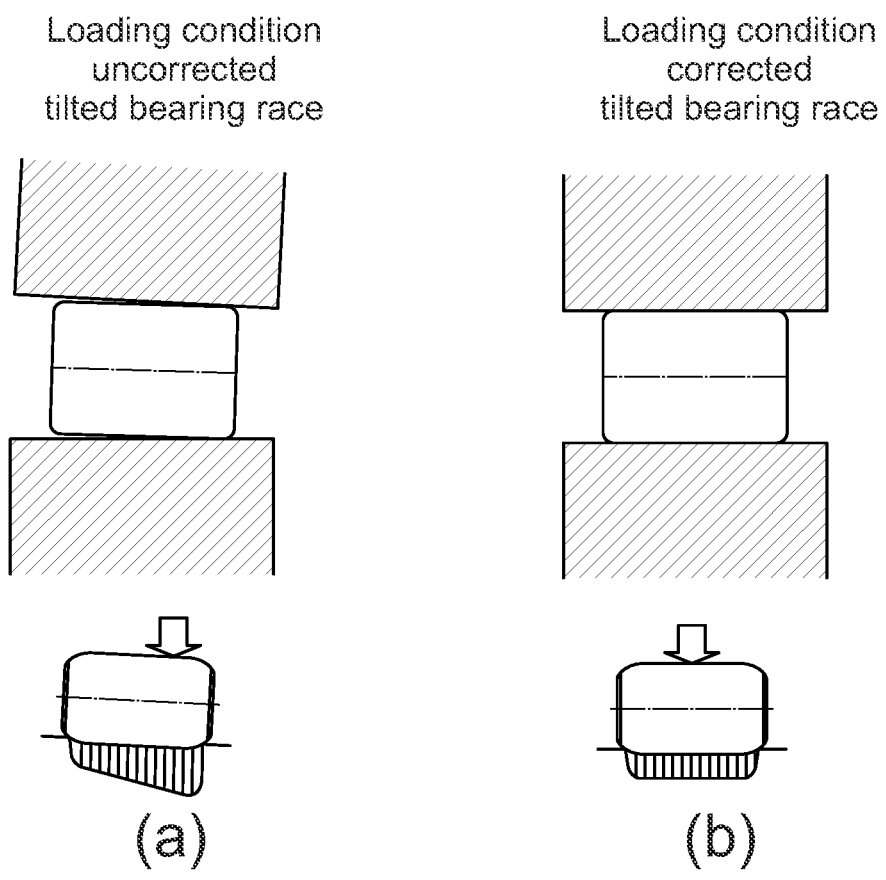

As FIG. 3 and FIG. 5 show, different or no bearing race correction can be provided sector by sector. For example, the at least one bearing race 9 may comprise, in two mutually opposite angular sectors 11 and 12, which may each include, for example, an angle W1 and W2, respectively, in the range of 20° to 160° or 40° to 120° or 60° to 100° or 70° to 90°, a different angular correction in the form of an inclination angle A1 and A2, respectively, which inclination angles A1 and A2 may differ from each other with respect to their sign or with respect to their magnitude.

As FIG. 1 shows, the angles of inclination A1 and A2 may, for example, have the same sign, so that the bearing race 9 inclines to the same side in both angular sectors 11 and 12, for example, sloping towards the bearing axis of rotation 18, when the horizontal position of the rolling bearing 1 shown in FIG. 1 is considered. However, the angles of inclination A1 and A2 can be of different sizes, wherein the angles of correction A1 and A2 can both be relatively small, for example smaller than 2° or smaller than 1°, although in principle larger angles of inclination can also be provided if the load case requires this. The deviation of the two inclination angles A1 and A2 from each other may also vary, for example one angle may be 0.1° or 0.2° or 0.3° or 0.4° larger than the other angle of inclination.

Alternatively, or in addition to a difference in magnitude between the two angles of inclination A1 and A2, the angles of inclination may also have different signs, as shown in FIG. 2, so that the bearing race 9 is inclined to different sides in the angular sectors 11 and 12. For example, the bearing race 9 in the angular sector 11 may rise towards the bearing axis of rotation 18, while the bearing race 9 in the angular sector 12 may fall towards the bearing axis of rotation 18, when considering the horizontal orientation of the rolling bearing 1 according to FIG. 2.

As FIG. 5 shows, in one angular sector 11 the bearing race 9 may be inclined downwards towards the outside, while in another angular sector 12 the bearing race 9 may be inclined downwards towards the inside of the bearing. In this respect the corresponding angles of inclination A1 and A2 can be of essentially the same size or of different sizes, see FIG. 5.

As FIGS. 3 and 5 show, between the two angular sectors 11 and 12 in which the different bearing race correction are provided, defined transition regions 13 and 14 may be provided in which the angular corrections from the adjacent angular sectors 11 and 12 smoothly taper off and/or smoothly merge into one another and/or no angular corrections or other bearing race corrections are provided.

The transition regions 13 and 14 may be opposite to each other and fill the remaining angular area left between the angular sectors 11 and 12 of the bearing race correction.

In particular, the bearing race 9 may be tilted and/or corrected with respect to its cross-sectional contour such that the rollers 6 contact the bearing race 9 across substantially its entire width and/or line contact occurs along substantially the entire width of the rollers 6. As the comparative illustration of FIG. 6 makes clear, with uncorrected bearing races 9, edge wear occurs when the bearing rings deform or tilt under load. The cylindrical or tapered rollers 6 only bear along their edges or the bearing force decreases considerably towards one side of the roller, see FIG. 6A. Such edge wear causes premature wear of the rolling elements 6 and/or the bearing race 9.

If, however, the bearing race 9 is corrected in such a way that, under load and the deformations of the bearing rings which occur in the process, the rollers 6 are loaded at least approximately uniformly over their entire width and a linear engagement takes place essentially over the entire width of the roller, as shown in FIG. 6B, the edge wear can be avoided and the associated wear prevented.

In particular, the bearing race 6 may be tilted when viewed in a radial sectional plane such that the tilting of the bearing ring occurring under load is compensated for and the inclination of the bearing ring 6 under load corresponds to the inclination of the supporting peripheral surface of the roller 6. If, for example, cylindrical rollers 6 are used as rolling bearings, the bearing race 6 may be corrected in such a way that, under load and consequent deformation of the bearing ring, the bearing race 6 extends parallel to the axis of rotation of the cylindrical roller and/or parallel to a plane perpendicular to the axis of rotation of the bearing if it is a thrust bearing series and/or parallel to the axis of rotation of the bearing if it is a radial bearing.

The bearing ring 2, on which the corrected bearing race 9 is provided, can, for example, be connected to the superstructure when used as a slewing gear bearing in the crane as shown in FIG. 4, so that the bearing ring 2 and thus the variable bearing race correction rotates with the boom 22 or is under load, so that the bending moments act in a defined manner from their direction to the bearing race correction.

As shown in FIGS. 1-2, the bearing ring 2 may include a toothing 20 on which a rotary drive, for example in the form of a motor drivable pinion, may engage to rotationally drive the bearing ring 2.

As further shown in FIGS. 1-2, one of the bearing rings, in particular the bearing ring 3 with the previously described groove 17 may also be configured to be split.

As the figures further show, the bearing space in which the rolling elements 6 are arranged may be sealed by one or more seals 24.

If the bearing race correction is formed on the bearing ring standing to the load, the angular sectors 11 and 12 in which the bearing race correction is formed may be configured, for example, symmetrically with respect to a plane extending upright through the bearing rotation axis 18 and the boom 22 of the crane 21. In particular, the upright plane passing through the boom 22 may extend approximately centrally through the angular sectors 11 and 12. In other options for use of the rolling bearing 1, the angular sectors can be aligned in a corresponding manner symmetrically or approximately centrally to the main load plane and/or to the plane of the greatest bending loads.

As can be seen from the figures, the bearing race modification is therefore no longer applied constantly over 360°, but is formed variably with defined transitions in different angular ranges. Usually, two different angular ranges can be defined for the bearing race correction, but there can be more than 2 different ranges. Likewise, it is possible to provide only one of the angular sector areas with a bearing race correction.

The bearing race modification can in particular be an angular correction, i.e., the bearing race is manufactured slightly angular compared to the uncorrected state. The correction angle can usually be less than 1°, but can also be larger.

The correction can also be carried out with other contours such as an arc-shaped modification.

The bearing race modification can be provided in the ring facing the load in the manner described, but may also be useful in the ring rotating relative to the load. In both cases, the alignment of the corrected angular ranges is made by the mounting position in the desired way.

Modifications can in principle be provided on one or both of the bearing race adjacent to a rolling element.

Irrespective of this, raceway corrections can be carried out on one or more rows of rolling elements.

In the case of multipart races, such as race 3, the bearing race corrections can also be applied in the parting lines of the rings.

Alternatively or additionally, a modification could also be provided in the contact surface of the rolling bearing 1 to the adjacent construction, for example on the rolling bearing 1 and/or on the adjacent construction. For example, the adjacent surface 25 by which the bearing race 2 is screwed to the adjacent structure could be slightly corrected in its angle, for example slightly inclined, to produce a corresponding correction in the engagement between the rolling elements 6 and the bearing race. Even with such a modification in the area of the contact surface between the rolling bearing 1 and the adjacent construction, the correction can advantageously be formed variably over the circumference, for example only in one angular sector 11 or in different angular sectors 11 and 12 in different ways, as described above for the bearing race correction.

Alternatively or additionally, in the case of joined cages, a modification can also be implemented by means of differently tapered rollers, as explained at the beginning.

FIG. 7 shows rolling elements 6 of different conical shapes arranged in different angular sectors 11, 12, of the rolling element cage 30 and/or only rolling elements 6 being conical are provided in one angular sector 11, 12 of the rolling element cage 30 and only rolling elements 6 being cylindrical are provided in another angular sector 11, 12.

The invention claimed is:
1. A rolling bearing comprising:
bearing rings with bearing races;
at least one row of rolling elements configured to roll on the bearing races; and
a bearing race correction configured to compensate torsions of at least one of the bearing rings under load;
wherein the bearing rings are concentric with one another and are supported on one another rotatably with respect to each other by the at least one row of rolling elements;
wherein the rolling elements are selected from the group consisting of cylindrical rollers and tapered rollers; and
wherein the bearing race correction is configured such that:
the bearing race correction is non-uniform over at least a portion of the circumference of at least one of the bearing rings;
the rolling elements are uniformly loaded at least approximately over an entire width of the rolling elements;
a line contact is established between the bearing races and the rolling elements over at least approximately the entire width of the rolling elements; and
when viewed in cross-section, the bearing races define plane contact lines which:
in the case of cylindrical rollers, are parallel to one another; and
in the case of tapered rollers, are inclined relative to one another in accordance with a taper angle of the tapered rollers.
2. A rolling bearing comprising:
bearing rings with bearing races;
at least one row of rolling elements configured to roll on the bearing races; and
a bearing race correction configured to compensate torsions of at least one of the bearing rings under load;

wherein the bearing rings are concentric with one another and are supported on one another rotatably with respect to each other by the at least one row of rolling elements; and wherein the bearing race correction is configured such that:

the bearing race correction is non-uniform over at least a portion of the circumference of at least one of the bearing rings;

the bearing race correction is a constant bearing race correction provided only in a fraction of the circumference of the at least one bearing ring;

the bearing race correction comprises bearing race correction portions, at least one bearing race correction portion being different than another bearing race correction portion, and the bearing race correction provided only in a fraction of the circumference of the at least one bearing ring; or the bearing race correction comprises bearing race correction portions, at least one bearing race correction portion being different than another bearing race correction portion, and the bearing race correction provided over the entire circumference of the at least one bearing ring.

3. The rolling bearing according to claim 2, wherein the bearing races have a cross-sectional race inclination angle and a cross-sectional shape; and wherein the bearing race correction:

comprises the at least one bearing race correction portion being different than another bearing race correction portion; and is further configured in such a way that different bearing race sections in different angular sectors of the at least one bearing ring have different:

race inclination angles; and/or shapes.

4. The rolling bearing according to claim 3, wherein the different race inclination angles are provided in two mutually opposite angular sectors and a transition region is provided in each case between the opposite angular sectors, in which transition region either:

one of the different race inclination angles merges continuously into the other of the different race inclination angles; or no bearing race correction is provided.

5. The rolling bearing according to claim 2, wherein the bearing race correction:

comprises the at least one bearing race correction portion being different than another bearing race correction portion; and is further configured in such a way that different bearing race sections in different angular sectors of the at least one bearing ring have different bearing race contours.

6. The rolling bearing according to claim 2, wherein both bearing rings are each provided with the bearing race correction.

7. The rolling bearing according to claim 2, wherein the bearing race correction:

comprises the at least one bearing race correction portion being different than another bearing race correction portion; and is further configured in such a way that different bearing race sections in different angular sectors of the bearing rings are curved to different degrees in an arc-shaped manner.

8. The rolling bearing according to claim 2, wherein both bearing rings are each provided with the bearing race correction; and wherein the bearing race correction:

comprises the at least one bearing race correction portion being different than another bearing race correction portion; and is further configured in such a way that different bearing race sections in different angular sectors of both bearing rings are different.

9. The rolling bearing according to claim 2, wherein the bearing race correction comprises the at least one bearing race correction portion being different than another bearing race correction portion and is provided over the entire circumference of the at least one bearing ring relative to the load.

10. A rolling bearing having two concentric bearing rings which are rotatably supported with respect to each other by means of at least one row of rolling elements and have bearing races for the rolling elements of the at least one row of rolling elements;

wherein the rolling elements are guided by a guided rolling element cage; and wherein:

rolling elements of different conical shapes are arranged in different angular sectors of the rolling element cage; and/or only conical rolling elements are provided in one angular sector of the rolling element cage and only cylindrical rolling elements are provided in another angular sector.

11. The rolling bearing according to claim 10 further comprising a bearing race correction in the form of an angle correction and/or a shape correction of a bearing race cross-section;

wherein at least one of the bearing races is provided with the bearing race correction.

12. A rolling bearing having two concentric bearing rings which are rotatably supported with respect to each other by means of at least one row of rolling elements and have bearing races for the rolling elements of the at least one row of rolling elements;

wherein at least one of the bearing rings has an adjacent surface for attachment to an adjacent construction which is provided with an adjacent correction; and wherein in different angular sectors of the bearing rings, the adjacent surface is provided with:

mutually different adjacent corrections; and/or the adjacent correction is provided only in a fraction of the circumference of the at least one bearing ring.

13. The rolling bearing according to claim 12, wherein different adjacent surface portions of the adjacent surface in different angular sectors have different terminal surface inclinations.

14. A machine comprising:

a load-receiving means extending from a boom or a support arm; and a slewing gear for rotating the boom or support arm about an upright slewing gear axis;

wherein the slewing gear comprises the rolling bearing according to claims 1, 2, 10 or 12.

15. The machine according to claim 14, wherein the bearing race correction is formed symmetrically with respect to an upright plane passing through the slewing gear axis and the load-receiving means.

16. The machine according to claim 15, wherein the bearing race correction is provided on the bearing ring which is rotatable together with the boom or support arm about the upright rotation axis.

17. The machine according to claim 14, wherein an adjacent structure connected to the rolling bearing has an adjacent surface to which one of the bearing rings of the rolling bearing is fixed; and
wherein the adjacent surface of the adjacent structure is provided in different angular sectors with mutually different adjacent corrections.

18. The machine according to claim 14, wherein the machine is selected from the group consisting of a crane and a cable excavator.

19. The machine according to claim 17, wherein the adjacent surface of the adjacent structure is provided in different angular sectors with:
different angular corrections; and/or
the adjacent correction of the adjacent surface provided only in a fraction of the circumference of the adjacent structure.

20. A rolling bearing comprising:
bearing rings with bearing races;
at least one row of rolling elements configured to roll on the bearing races; and
a bearing race correction configured to compensate torsions of at least one of the bearing rings under load;
wherein the bearing rings are concentric with one another and are supported on one another rotatably with respect to each other by the at least one row of rolling elements;
wherein the rolling elements are selected from the group consisting of cylindrical rollers and tapered rollers;
wherein the bearing race correction is configured such that:
the bearing race correction is non-uniform over at least a portion of the circumference of at least one of the bearing rings;
the rolling elements are uniformly loaded at least approximately over an entire width of the rolling elements;
a line contact is established between the bearing races and the rolling elements over at least approximately the entire width of the rolling elements; and
when viewed in cross-section, the bearing races define plane contact lines which:
in the case of cylindrical rollers, are parallel to one another; and
in the case of tapered rollers, are inclined relative to one another in accordance with a taper angle of the tapered rollers; and
wherein at least one of:
the bearing races have a cross-sectional race inclination angle and a cross-sectional shape, wherein the bearing race correction comprises the at least one bearing race correction portion being different than another bearing race correction portion and is further configured in such a way that different bearing race sections in different angular sectors of the at least one bearing ring have different race inclination angles and/or shapes;
the bearing race correction comprises the at least one bearing race correction portion being different than another bearing race correction portion, and is further configured in such a way that different bearing race sections in different angular sectors of the at least one bearing ring have different bearing race contours;
both bearing rings are each provided with the bearing race correction;
the bearing race correction comprises the at least one bearing race correction portion being different than another bearing race correction portion, and is further configured in such a way that different bearing race sections in different angular sectors of the bearing rings are curved to different degrees in an arc-shaped manner;
both bearing rings are each provided with the bearing race correction, wherein the bearing race correction comprises the at least one bearing race correction portion being different than another bearing race correction portion, and is further configured in such a way that different bearing race sections in different angular sectors of both bearing rings are different;
the bearing race correction comprises the at least one bearing race correction portion being different than another bearing race correction portion and is provided over the entire circumference of the at least one bearing ring relative to the load;
the bearing races have a cross-sectional race inclination angle and a cross-sectional shape, wherein the bearing race correction comprises the at least one bearing race correction portion being different than another bearing race correction portion and is further configured in such a way that different bearing race sections in different angular sectors of the at least one bearing ring have different race inclination angles and/or shapes, wherein the different race inclination angles are provided in two mutually opposite angular sectors and a transition region is provided in each case between the opposite angular sectors, in which transition region either one of the different race inclination angles merges continuously into the other of the different race inclination angles, or no bearing race correction is provided.

21. A rolling bearing comprising:
bearing rings with bearing races;
at least one row of rolling elements configured to roll on the bearing races; and
a bearing race correction configured to compensate torsions of at least one of the bearing rings under load;
wherein the bearing rings are concentric with one another and are supported on one another rotatably with respect to each other by the at least one row of rolling elements;
wherein the bearing race correction is configured such that:
the bearing race correction is non-uniform over at least a portion of the circumference of at least one of the bearing rings;
the bearing race correction is a constant bearing race correction provided only in a fraction of the circumference of the at least one bearing ring;
the bearing race correction comprises bearing race correction portions, at least one bearing race correction portion being different than another bearing race correction portion, and the bearing race correction provided only in a fraction of the circumference of the at least one bearing ring; or
the bearing race correction comprises bearing race correction portions, at least one bearing race correction portion being different than another bearing race correction portion, and the bearing race correction provided over the entire circumference of the at least one bearing ring; and
wherein at least one of:
the bearing races have a cross-sectional race inclination angle and a cross-sectional shape, wherein the bearing race correction comprises the at least one bearing race correction portion being different than another bearing race correction portion and is further configured in such a way that different bearing race sections in different angular sectors of the at least one bearing ring have different race inclination angles and/or shapes;

the bearing race correction comprises the at least one bearing race correction portion being different than another bearing race correction portion, and is further configured in such a way that different bearing race sections in different angular sectors of the at least one bearing ring have different bearing race contours;

both bearing rings are each provided with the bearing race correction;

the bearing race correction comprises the at least one bearing race correction portion being different than another bearing race correction portion, and is further configured in such a way that different bearing race sections in different angular sectors of the bearing rings are curved to different degrees in an arc-shaped manner;

both bearing rings are each provided with the bearing race correction, wherein the bearing race correction comprises the at least one bearing race correction portion being different than another bearing race correction portion, and is further configured in such a way that different bearing race sections in different angular sectors of both bearing rings are different;

the bearing race correction comprises the at least one bearing race correction portion being different than another bearing race correction portion and is provided over the entire circumference of the at least one bearing ring relative to the load;

the bearing races have a cross-sectional race inclination angle and a cross-sectional shape, wherein the bearing race correction comprises the at least one bearing race correction portion being different than another bearing race correction portion and is further configured in such a way that different bearing race sections in different angular sectors of the at least one bearing ring have different race inclination angles and/or shapes, wherein the different race inclination angles are provided in two mutually opposite angular sectors and a transition region is provided in each case between the opposite angular sectors, in which transition region either one of the different race inclination angles merges continuously into the other of the different race inclination angles, or no bearing race correction is provided.

* * * * *